Figure 1:
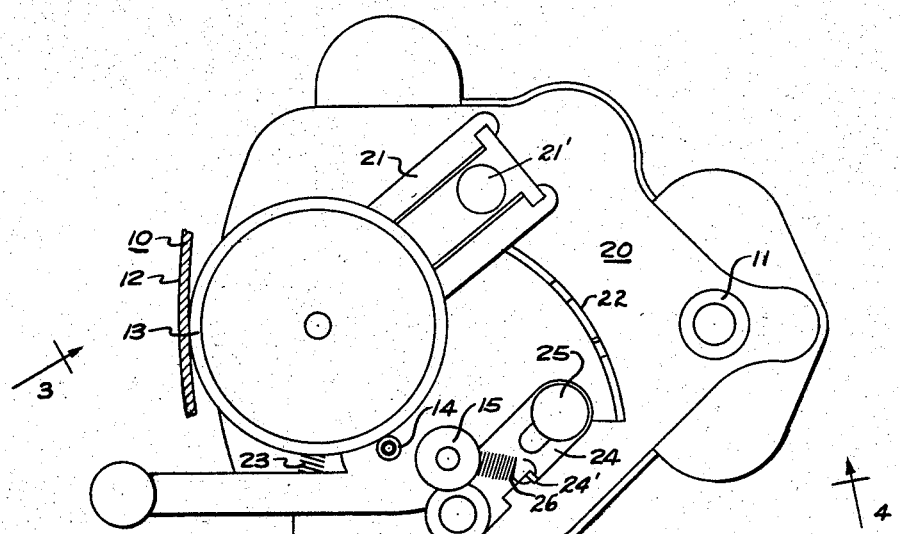

May 5, 1959 — W. B. COVEN — 2,884,795
DRIVE MECHANISM FOR RECORD PLAYERS
Filed March 26, 1956 — 2 Sheets-Sheet 1

INVENTOR.
Warren B. Coven
BY Clyde H. Haynes
his Atty.

May 5, 1959 W. B. COVEN 2,884,795
DRIVE MECHANISM FOR RECORD PLAYERS
Filed March 26, 1956 2 Sheets-Sheet 2

INVENTOR.
Warren B. Coven
BY Clyde H. Haynes
his attorney

United States Patent Office 2,884,795
Patented May 5, 1959

2,884,795

DRIVE MECHANISM FOR RECORD PLAYERS

Warren B. Coven, Kipton, Ohio, assignor to The General Industries Company, Elyria, Ohio, a corporation of Ohio Application March 26, 1956, Serial No. 573,980

20 Claims. (Cl. 74—200)

The present invention relates generally to the drive mechanism for record players and in particular to a mechanism in which a driven wheel is engageable, with a driving wheel and is also engageable with a pair or plurality of pulleys which in turn engage a driving wheel.

In the present specification any reference to drive mechanism, record player or record speed is for purposes of description only. It is understood that record players may be constructed for operating at other speeds if desired and that these specific speeds are used herein solely because they are standard speed now used in the industry.

The term revolution or revolvable as herein used refers to the path or movement, including, but not limited to, modified straight line, arcuate, curved, or a combination thereof, of the axis of a wheel, pulley, shaft, or the like, relative to or about an axis, location, point or the like other than its own axis. The term rotate as used herein refers to the rotating or turning of a wheel, pulley shaft, or the like on its own axis.

One of the objects of the invention is to provide a drive mechanism for a record player capable of handling records of various r.p.m. speeds and rotating those records at their correct speed in a constant and uniform rotational movement.

Another object of the invention is to provide a drive mechanism for a record player with wheels and pulleys wherein each wheel or pulley is movable relative to every wheel or pulley which it engages or may engage.

Another object of the invention is to provide a multiple speed drive mechanism for a record player with a driving wheel, a driven wheel, a pair of transmission pulleys, and means to align the same in a desired one of the several engaging positions whereby various selected speeds or desired speeds may be obtained on the driven wheel.

A still further object of the invention is to provide means for at least partially revolving transmission pulleys about spaced locations and into and out of engagement with a driving wheel or shaft and a driven wheel.

A still further object of the invention is to provide spring tension or resilient pressure forces maintaining the wheels, shafts and pulleys in a drive mechanism in correct engagement with each other, regardless of the speed position they may be in.

Figure 2:
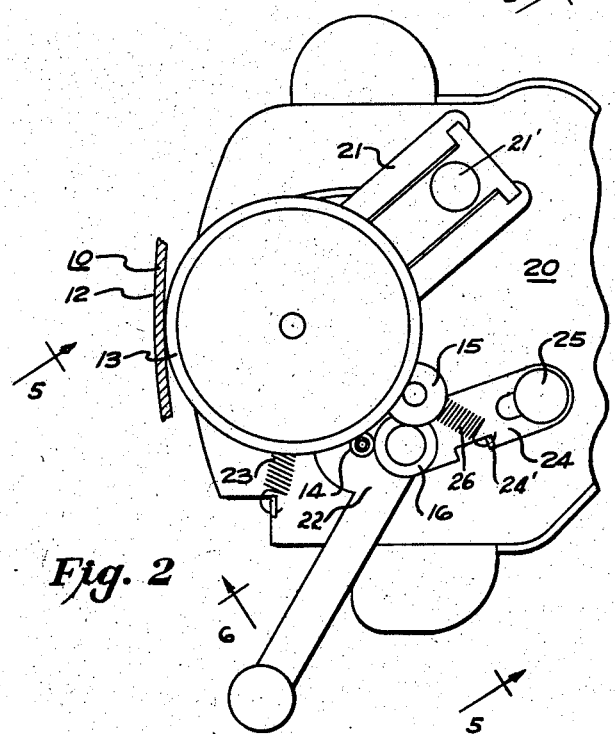
Figure 3:
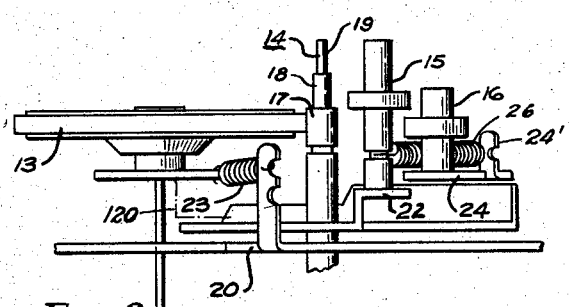
Figure 7:
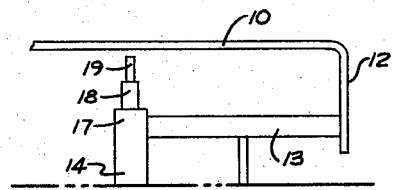
Figure 4:
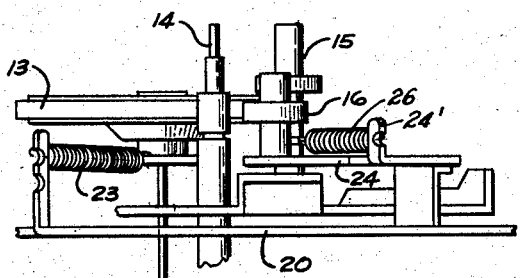
Figure 8:
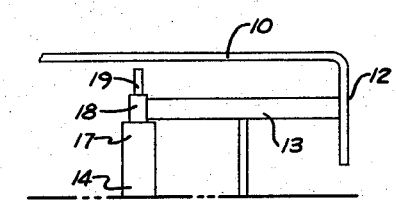
Figure 5:
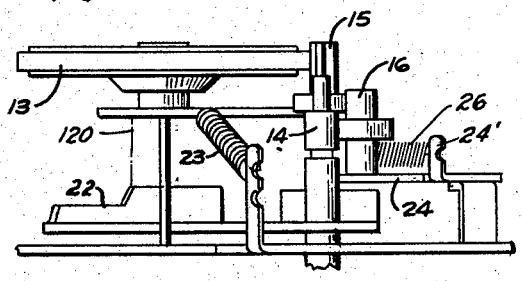
Figure 6:
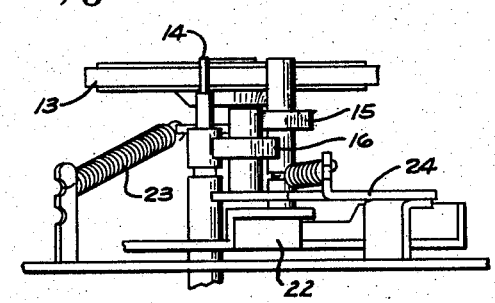

A further understanding of the invention and its objects, definitions and claims will become apparent from the following description of one of the embodiments of the invention as illustrated in the accompanying drawings in which:

Figure 1 is a top plan view of a drive mechanism for a record player with the driven wheel in direct engagement with the driving wheeel to provide a selected speed, Figure 2 is a view similar to Figure 1 with the driven wheel and driving wheel in engagement with the transmission pulleys to provide another selected or desired speed, Figure 3 is a view approximately along the line 3—3 of Figure 1, Figure 4 is a view approximately along the line 4—4 of Figure 1, Figure 5 is a view approximately along the line 5—5 of Figure 2, Figure 6 is a view approximately along the line 6—6 of Figure 2, Figure 7 is a schematic view of the turntable, driven wheel or idler and driving shaft in engagement for "A" r.p.m. rotation of the turntable, Figure 8 is a schematic view of the turntable, driven wheel idler and driving shaft in engagement for "B" r.p.m. rotation of the turntable.

Figure 11:
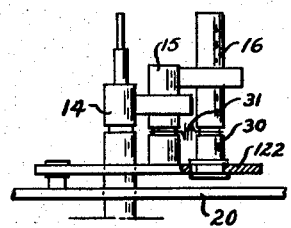
Figure 9:
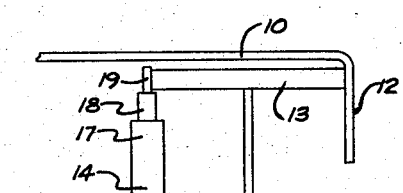
Figure 10:
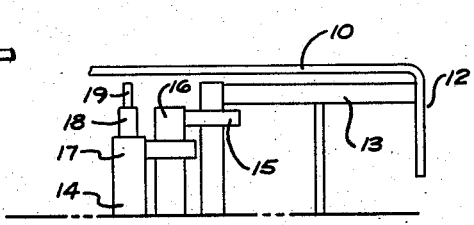

Figure 9 is a schematic view of the turntable, driven wheel or idler and driving shaft in engagement for "C" r.p.m. rotation of the turntable, Figure 10 is a schematic view of the turntable, driven wheel, pulleys and driving shaft in engagement for "D" r.p.m. rotation of the turntable, and Figure 11 illustrates a modification of the invention.

In the present embodiment of the invention a record player turntable 10 of the rim drive type is rotatably supported by a post 11 with its rim 12 in driving engagement with a driven wheel or idler 13, which in turn is driven or rotated by a driving shaft 14. The term drive shaft as used herein is meant to include the shaft of an electric motor, or other rotational types of motors, or a driving wheel operatively connected to such a motor. The driven wheel 13 may either be in direct driving engagement with the driving shaft 14 as in Figures 1, 3, 4, 7, 8, and 9, or it may be driven thereby by means of transmission pulleys 15 and 16 which operatively engage the wheels 13 and 14, as in Figures 2, 5, 6, and 10.

The Figures 1, 3, 4, and 7 illustrate the driven wheel or idler 13 in engagement with the driving wheel or shaft 14 for driving the turntable at a speed of "A" r.p.m., such as 78 r.p.m. and the Figures 2, 5, 6, and 10 illustrate the driven wheel or idler 13, the transmission pulleys 15 and 16 and the driving wheel or shaft 14 in operative engagement for driving the turntable at a slower speed of "D" r.p.m., such as 16 r.p.m. The driven wheel 13 may also engage the driving wheel for rotating the turntable at desired other speeds of "B" r.p.m., such as 45 r.p.m., and "C" r.p.m., such as 33⅓ r.p.m. These various speeds are obtained by providing one of the wheels, in this case the driving wheel or shaft 14, with portions 17, 18, and 19 of different diameters as illustrated schematically in Figures 7, 8, and 9.

In the present embodiment of the invention the driving shaft 14 is bearingly supported by a plate 20 or by suitable means such as a motor housing mounted on the plate 20. The driven wheel 13 is rotatably mounted on a mount, member or mechanism 21, or the like, movably mounted by a suitable mounting 21' on the plate 20 and adapted to be actuated by a cam member 22 through mechanical movement means, indicated by the dash-dot line 120 in the drawing, and whereby movement of the cam member 22 relative to the plate 20, or vice versa, causes movement of the driven wheel 13 into and out of engagement with the desired one of the portions 17, 18, and 19 of the driving wheel, or vice versa, and as more fully explained and described in copending Patent Number 2,746,306 issued May 26, 1956 to H. L. Hartman and assigned to the assignee of the present invention. A spring 23, or equivalent resilient material, urges and maintains the driven and driving wheels in operative relationship when they are positioned in engagement.

It is noted that in actual construction the portion 19 of shaft 14 is of very small diameter so that turntable 10 will be rotated at a speed of "C" r.p.m., such as 33⅓ r.p.m. In actual construction this diameter may be in the order of ⁹⁄₃₂" whereas the diameter of portion 17 may be in the order of ¼". To simply add another portion to the shaft of a diameter sufficiently small to drive the turntable at "D" r.p.m., such as 16 r.p.m., has been found to be impractical because such a portion would have such a small diameter that it would not properly and drivingly engage the driven wheel 13. Therefore the transmission pulleys 15 and 16 are supported for movement into and out of engagement with the driven and driving wheels 13 and 14.

The transmission pulley 15 is rotatably mounted on a member, in this instance the cam member 22, which is pivotally or movably mounted on the plate 20 at a location other than the axis of rotation of the pulley 15, to provide relative movement between pulley 15 and wheel 13, thus providing at least partial revolving of the pulley 15 into and out of engagement with the driven wheel 13. When the pivot axis of cam member 22 coincides with the axis of rotation of driving shaft 14, as illustrated, the pulley 15 is at least partly revolvable about the axis of the driving shaft 14. It is understood that the member supporting the pulley 15 may be pivoted to the plate at other locations if desired.

Similarly transmission pulley 16 is rotatably mounted on a member 24 which may be loosely pivoted on plate 20 at a location, such as 25, other than the location at which member 22 is mounted. Thus the axis of rotation of transmission pulley 16 is movable relative to the axis of pulley 15, or is at least partially revolvable about an axis spaced from the axis of revolution of the transmission pulley 15, thereby ensuring driving engagement between the transmission pulleys when they are in contact and especially when they are in engagement with the driven and driving wheels 13 and 14 as illustrated in Figures 2, 5, 6, and 10. Resilient means such as a spring 26 is tensioned between the support for transmission pulley 15 and a portion 24' of support 24 for wheel 16. This portion 24' is positioned between pulley 16 and pivot 25. Also as illustrated in the drawings wheel 15 is closer to pivot 25 than wheel 16.

When the pulleys 15 and 16 are out of contact with the driving and driven wheels 14 and 13, the pulleys 15 and 16 are out of contact with each other as illustrated in Figures 1 and 3. When pulley 15 is moved into contact with driven wheel 13 as illustrated in Figure 2, a spring 26 urges member 24 toward pulley 15 and driving wheel 14. The spring 26 thus urges the transmission pulleys 15 and 16 into operative engagement with each other when the transmission pulleys are in engagement with the driving and driven wheels thereby compensating for manufacturing tolerances, bearing wear or other variables to insure continuing, constant and non-varying rotating speed in the turntable when the transmission pulleys are in use.

In the modification of Figure 11 the transmission pulley 16 is rotatably and slideably or movably mounted on the same member as pulley 15. This is accomplished by slideably mounting axle 30 which rotatably carries pulley 16 on member 122 which is substituted for cam member 22 in the preferred embodiment. The axis of pulley 15 and the axis of pulley 16 are thus movable relative to each other and may be urged towards each other by a resilient means, such as spring 31 connected between axle 30 and member 122 or the axle of pulley 15.

In the preferred embodiment, as well as in the modification, each wheel and pulley is movable relative to the wheel or pulley which it engages. Thus pulley 15 is movable relative to pulley 16 and wheel 13 or vice versa. Pulley 16 is movable relative to pulley 15 and wheel 12 or vice versa. Likewise wheel 12 is movable relative to wheel 13 or vice versa.

Movement of one part relative to another is intended to be viewed in the broad aspects wherein the scope of the invention includes the moving of either part relative to the other.

The transmission pulleys are supported such that when pulley 15 is in engagement with driven wheel 13, pulley 16 is in engagement with pulley 15 and driving wheel or shaft 14 to effect rotational transmission of power from shaft 14 to driven wheel 13.

In the present embodiment the speed of the turntable can be changed from one speed of rotation to another simply by moving the cam member relative to the plate. This effects movement of the driven and driving wheels into and out of engagement to provide several of the speeds. In one of the out of engagement positions the pulleys are moved into engagement with the wheels to provide another speed for the turntable. In this instance the cam member moves the pulley 15 into engagement with the wheel 13 when it moves wheel 13 out of engagement with wheel 14 or vice versa. Spring 26 moves pulley 16 into engagement with wheel 14 and pulley 15.

In this embodiment as described and illustrated herein the axis of revolution of the pulleys is spaced apart to ensure proper engagement of the wheels and pulleys for the respective speeds. The supporting structure supporting the wheels and pulleys supports them in operative relationship and the springs assure frictional engagement at all desired speeds.

The pulleys are sized or of such diameter that particular speeds are obtained. Changes in these speeds may be had by using pulleys of other diameters. Similarly one of the wheels is stepped to provide portions for each of the various speeds.

It is understood that various changes may be made in the arrangement of parts or materials as described without departing from the spirit and scope of the invention as hereinafter claimed.

What is claimed is:

1. A drive mechanism for a record player comprising, driven wheel means, driving wheel means, a first transmission pulley movable relative to one of said means into and out of engagement therewith, a second transmission pulley movable relative to the other of said means and said first pulley into and out of engagement therewith, and structure supporting said means and said pulleys and operative to move said pulleys into and out of engagement with each other and said means.

2. The drive mechanism of claim 1 including resilient means associated with said wheels and pulleys and urging them in engagement with each other.

3. A drive mechanism for a record player comprising, a driven wheel, a driving wheel, a plurality of pulleys, means for positioning said wheels in or out of engagement with each other, means for positioning said pulleys out of engagement with each other and said wheels and for positioning said pulleys in engagement with said wheels when the wheels are out of engagement with each other, and resilient means urging said pulleys into engagement with each other.

4. A drive mechanism for a record player comprising, a driven wheel, a driving wheel, a plurality of pulleys, means for positioning said wheels in or out of engagement with each other, means for positioning said pulleys out of engagement with each other and said wheels and for positioning said pulleys in engagement with said wheels when the wheels are out of engagement with each other, and resilient means urging said pulleys and said wheels into engagement with each other.

5. A drive mechanism for a record player comprising, a driven wheel, a driving wheel, a pair of pulleys, means for positioning said wheels in or out of engagement with each other and for positioning said pulleys in engagement with said wheels when the wheels are out of engagement with each other, a plate bearingly supporting one of said wheels, said means including members supporting said pulleys and movably mounted on said plate to position the pulleys in or out of engagement with the wheels, and spring-like means urging said pulleys into engagement with each other.

6. A drive mechanism for a record player comprising, a driven wheel, a driving wheel, a pair of pulleys, means for positioning said wheels in or out of engagement with each other and for positioning said pulleys in engagement with said wheels when the wheels are out of engagement with each other, said means including a plate bearingly supporting one of said wheels, cam actuated member movably mounted on said plate and rotatably carrying the other of said wheels, and members supporting said pulleys and pivoted on said plate to position the pulleys in or out of engagement with the wheels, one of said members constituting a cam in engagement with said cam actuated member, and spring like means urging said pulleys into engagement with each other, one of said members being pivoted on said plate at a pivot axis coinciding with the axis of one of said wheels.

7. A drive mechanism for a record player comprising, a driven wheel, a driving wheel, a pair of pulleys, means for positioning said wheels in or out of engagement with each other and for positioning said pulleys in engagement with said wheels when the wheels are out of engagement with each other, a plate bearingly supporting one of said wheels, said means including a first member supporting one of said pulleys and pivoted on said plate at a first location and a second member supporting the other of said pulleys and movably mounted on said plate at a second location spaced from said first location.

8. A drive mechanism comprising, a driven wheel, a driving wheel, and a pair of pulleys, means for positioning said wheels in or out of engagement with each other and for positioning said pulleys in engagement with said wheels when the wheels are out of engagement with each other, a plate bearingly supporting said driving wheel, said means including a member movably mounted on said plate and rotatably carrying said driven wheel, and members supporting said pulleys in movable relationship to position the pulleys in or out of engagement with each other and with the wheels.

9. A drive mechanism for a record player comprising, a driven wheel, a driving wheel, and a pair of pulleys, means for positioning said wheels in or out of engagement with each other and for positioning said pulleys in engagement with said wheels when the wheels are out of engagement with each other, a plate bearingly supporting said driving wheel, said means including a cam actuated member movably mounted on said plate and rotatably carrying said driven wheel, and members supporting said pulleys in movable relationship to position the pulleys in or out of engagement with each other and with the wheels, one of said members constituting a cam in engagement with said cam actuated member.

10. A drive mechanism for a record player comprising, a driven wheel, a driving wheel, and a pair of pulleys, means for positioning said wheels in or out of engagement with each other and for positioning said pulleys in engagement with said wheels when the wheels are out of engagement with each other, a plate bearingly supporting said driving wheel, said means including a cam actuated member movably mounted on said plate and rotatably carrying said driven wheel, and members supporting said pulleys, said members being mounted on said plate to position the pulleys in or out of engagement with each other and with the wheels, one of said members being pivoted on said plate at a pivot axis coinciding with the axis of said driving wheel.

11. A drive mechanism for a record player comprising, a driven wheel, a driving wheel, and a pair of pulleys, spring means urging said pulleys into engagement with each other, means for positioning said wheels in or out of engagement with each other and for positioning said pulleys in engagement with said wheels when the wheels are out of engagement with each other, a plate bearingly supporting said driving wheel, said means including a cam actuated member movably mounted on said plate and rotatably carrying said driven wheel, and members supporting said pulleys, said members being pivoted on said plate to position the pulleys in or out of engagement with each other and with the wheels.

12. A drive mechanism for a multiple speed record player comprising, a first wheel, a second wheel having portions of various diameters engageable with said first wheel, means for positioning said first wheel and the desired one of said portions in engagement with each other, a first transmission pulley somewhat revolvable at least partially about an axis into and out of engagement with said first wheel, a second transmission pulley somewhat revolvable about an axis other than said first mentioned axis into and out of engagement with one of said portions of said second wheel and said first pulley, and structure operatively supporting said wheels and pulleys and operative to move said pulleys into and out of engagement with each other and said wheels.

13. A drive mechanism for a record player comprising, a driven wheel, a driving wheel having portions of various diameters engageable with said driven wheel, means for positioning said driven wheel and the desired one of said portions in engagement with each other, a first transmission pulley revolvable at least partially about an axis into and out of engagement with said driven wheel, a second transmission pulley revolvable about an axis other than said first mentioned axis into and out of engagement with one of said portions of said driving wheel and said first pulley, structure operatively supporting said wheels and pulleys and operative to move said pulleys into and out of engagement with each other and said wheels, and springs in said structure exerting spring tension on at least one of said pulleys and one of said wheels in directions urging them into operative relationship.

14. A drive mechanism for a record player comprising, driven wheel means, driving wheel means, a first transmission pulley revolvable at least partially about an axis into and out of engagement with one of said means, a second transmission pulley somewhat revolvable about an axis other than said first mentioned axis into and out of engagement with the other of said means and said first transmission pulley, and structure supporting said means and pulleys and operative to move said pulleys into and out of engagement with each other and said wheel means.

15. A drive mechanism for a record player comprising, driven wheel means, driving wheel means, a first transmission pulley revolvable at least partially about an axis into and out of engagement with one of said means, a second transmission pulley revolvable about an axis other than said first mentioned axis into and out of engagement with the other of said means and said first transmission pulley, structure supporting said means and pulleys and operative to move said pulleys into and out of engagement with each other and said wheel means, and springs in said structure exerting spring tension on at least one of said means and one of said pulleys in directions urging them into engagement.

16. A drive mechanism for a record player comprising, driven wheel means, driving shaft means, a first transmission pulley revolvable at least partially about an axis substantially coinciding with the axis of one of said means into and out of engagement with the other of said means, a second transmission pulley revolvable about an axis other than the first mentioned axis into and out of engagement with said one of said means and said first transmission pulley, and structure supporting said means and said pulleys and operative to move said pulleys into and out of engagement with each other and said means.

17. A drive mechanism for a record player comprising, first rotatable means, second rotatable means having an axis of rotation, third rotatable means having an axis of rotation revolvable at least partly around the axis of said second means and thereby movable into and out of engagement with said first means, fourth rotatable means having an axis of rotation revolvable about an axis other than the axis of said second means and thereby movable into and out of engagement with said second and third means, and structure supporting said means and operative to move said third and fourth rotatable means into and out of engagement with each other and said first and second rotatable means.

18. A drive mechanism for a record player comprising, a driven wheel, a driving wheel, a pair of pulleys, means for positioning said wheels in or out of engagement with each other and for positioning said pulleys in engagement with said wheels when the wheels are out of engagement with each other, a plate bearingly supporting one of said wheels, said means including a first member supporting one of said pulleys and pivoted on said plate and a second member supporting the other of said pulleys and movable relative to said first member.

19. A drive mechanism for a record player comprising, a driven wheel, a driving wheel, a pair of pulleys, means for positioning said wheels in or out of engagement with each other and for positioning said pulleys in engagement with said wheels when the wheels are out of engagement with each other, a plate bearingly supporting said driving wheel, said means including a cam actuated member movably mounted on said plate and rotatably carrying said driven wheel, and members supporting said pulleys in movable relationship to position the pulleys in or out of engagement with each other and with the wheels, one of said members constituting a cam in engagement with said cam actuated member and the other of said members being slidably mounted on said cam.

20. The drive mechanism of claim 19 including resilient means associated with said wheels and pulleys and urging them in engagement with each other.

References Cited in the file of this patent

UNITED STATES PATENTS

| | | |
|---|---|---|
| 2,584,580 | Hardy | Feb. 5, 1952 |
| 2,724,277 | Johnson et al. | Nov. 22, 1955 |
| 2,756,603 | Tsien | July 31, 1956 |